United States Patent [19]

Igarashi et al.

[11] Patent Number: 6,083,564
[45] Date of Patent: Jul. 4, 2000

[54] METHOD FOR FORMING MULTI-LAYER COATING FILM

[75] Inventors: Hiroshi Igarashi; Yasumasa Okumura, both of Yokohama, Japan

[73] Assignee: Kansai Paint Co., Ltd., Hyogo-ken, Japan

[21] Appl. No.: 09/140,014

[22] Filed: Jun. 26, 1998

[30] Foreign Application Priority Data

Aug. 26, 1997 [JP] Japan .................................. 9-228674

[51] Int. Cl.$^7$ ................................ B05D 1/36; B05D 7/02
[52] U.S. Cl. ........................................ 427/407.1; 427/409
[58] Field of Search ................................ 427/407.1, 409

[56] References Cited

U.S. PATENT DOCUMENTS

| | | | |
|---|---|---|---|
| 3,088,948 | 5/1963 | Little et al. | |
| 3,477,996 | 11/1969 | Formaini . | |
| 3,919,144 | 11/1975 | Formaini et al. | 525/501.5 |
| 4,388,445 | 6/1983 | Sugiura et al. | 525/124 |
| 4,413,036 | 11/1983 | Drexler et al. | 428/458 |
| 4,604,300 | 8/1986 | Keys et al. | 427/120 |
| 5,288,520 | 2/1994 | Toyoshima et al. | 427/322 |
| 5,395,659 | 3/1995 | Graf et al. | 427/407.1 |
| 5,660,937 | 8/1997 | Ishidoya et al. | 427/407.1 |
| 5,705,595 | 1/1998 | Oda et al. | 528/71 |
| 5,725,908 | 3/1998 | Ogasawara et al. | 427/407.1 |

OTHER PUBLICATIONS

Patent abstracts of Japan, vol. 008, No. 011 (C–205), Jan. 18, 1984 & JP 58 179277 A (Furukawa Denki Kogyo KK), Oct. 20, 1983.

Glazewska et al., "Impregnating varnish for electroinsulating purposes", Chemical Abstracts, vol. 102, No. 18, May 6, 1985, Columbus, Ohio, US; abstract No. 151007, XP002087845, & PL 123 257 B.

Patent abstracts of Japan, vol. 016, No. 234 (C–0945), May 29, 1992 & JP 04 048971 A (Aisin Chem Co Ltd), Feb. 18, 1992.

*Primary Examiner*—Diana Dudash
*Attorney, Agent, or Firm*—Wenderoth, Lind & Ponack, LLP

[57] ABSTRACT

The application discloses a method for forming a multi-layer coating film on a coating object, which comprises applying a first colored paint, second colored paint and a clear paint onto a coating object by 3 coat-1 bake system, which is characterized in that at least either one of said first and second colored paints comprises a polyester resin, crosslinking agent and coloring pigment, said polyester resin being one prepared with use of tris(2-hydroxyethyl)isocyanurate as at least a part of its polyhydric alcohol component. According to this method, mixing of coating layers at their interfaces is prevented to improve appearance and levelling property of the coated film.

10 Claims, No Drawings

METHOD FOR FORMING MULTI-LAYER COATING FILM

This invention relates to a method for forming multi-layer coating film by applying a first colored paint, a second colored paint and a clear paint by 3 coat-1 bake system.

So called "3 coat-1 bake system (3C1B)" for forming multi-layer coating film has been widely adopted as a top-coat forming method on automobile body panel or the like, in which system a substrate to be coated is applied with a first colored paint (solid color or metallic paint, or the like), onto the painted surface not yet cured, a transparent, second colored paint is applied, and onto so formed uncured, painted surface further a clear paint is applied, followed by heating to cure the three-layered paint film simultaneously. As these first and second colored paints, thermosetting paints containing hydroxyl-containing polyester resin and melamine resin have been used. Furthermore, as such hydroxyl-containing polyester resin, one prepared by using as a part of its polyhydric alcohol component tri or higher hydric alcohols such as trimethylolethane, trimethylolpropane and the like has been used.

However, when such first and second colored paints containing said hydroxyl-containing polyester resin are applied wet-on-wet, mixing of the two layers occur at the uncured interface between the two coated planes, which occasionally impairs appearance of the coated film. This interfacial mixing phenomenon can occur also between a second colored coating film containing a hydroxyl-containing polyester resin and a clear coating film.

As a means to prevent the interfacial mixing of coating layers, it was proposed to add a high molecular weight resin having a number-average molecular weight of at least about 100,000 to these colored paints, but the addition is apt to cause face roughening and reduces levelling property of the coated surface.

We have engaged in concentrative studies with the view to remove those problems in the multi-layer coating film-forming method comprising applying a first and second thermosetting colored paints containing hydroxyl-containing polyester resin and a clear paint by 3C1B system, to discover that interfacial mixing of the first and second coating layers does not take place and the appearance of the formed film is improved, when polyester resin prepared with at least partial use of tris(2-hydroxyethyl)isocyanurate as its polyhydric alcohol component is used as said hydroxyl-containing polyester resin which is contained in either one or both of the first and second colored paints, without addition of any high molecular weight resin.

Thus, according to the present invention a method for forming a multi-layer coating film on a coating object is provided which comprises applying a first and second colored paints and a clear paint by 3 coat-1 bake system, characterized in that at least one of said first and second colored paints comprises a polyester resin, crosslinking agent and a coloring pigment, said polyester resin being one prepared with use of tris(2-hydroxyethyl)isocyanurate as at least a part of its polyhydric alcohol component.

Hereafter the method of the present invention is explained in further details.

As substrate to which the method of the present invention is applicable, metallic or plastic automobile body panels can be named for example. If necessary, these substrates are given a chemical surface pretreatment or washing treatment in advance. As the coating object, also a substrate which has been applied with an undercoat paint such as cationic electropaint, or with an undercoat paint and a surfacer can be conveniently used.

The first colored paint according to the method is applied onto a coating object before the second colored paint. As the first colored paint, conveniently used is a thermosetting liquid paint capable of forming a solid color or metallic tone coating film which exhibits excellent hiding power of an extent rendering it impossible to perceive the color tone at the surface of the coating object through the coating film.

The second colored paint is to be applied onto the surface applied with uncured coating film of said first colored paint, preceding application of a clear paint. As the second colored paint, a thermosetting liquid paint capable of forming a solid color or metallic/tone coating film which is transparent and colored to an extent allowing perception of the color tone of the surface coated with the first colored paint through the transparent coating film is preferably used.

The method of the present invention is characterized by the use of thermosetting liquid paint comprising a polyester resin (A) which is prepared using as at least a part of its polyhydric alcohol component tris(2-hydroxyethyl)isocyanurate (eg., THEIC, tradename: Nissan Chemical Industries K.K.), a crosslinking agent (B) and a coloring pigment (C), as either one or both of these first and second colored paints.

The coating film-forming method according to the present invention includes the following three process variants a)–c):

a) application of a first colored paint containing said polyester resin (A), second colored paint which does not contain the polyester resin (A) and a clear paint, by 3C1B system;

b) application of a first colored paint which does not contain the polyester resin (A), a second colored paint which contains the polyester resin (A) and a clear paint, by 3C1B system; and c) application of a first colored paint which contains the polyester resin (A), a second colored paint which contains the polyester resin (A) and a clear paint by 3C1B system.

Of those, in particular, the process variant c) is preferred for the method of the present invention.

Polyester Resin (A):

Polyester resin (A) is a hydroxyl-containing polyester resin which is prepared through an esterification reaction between polyhydric alcohol component containing THEIC and polybasic acid component.

THEIC is a per se known compound containing three hydroxyl groups, including its derivatives in which a part or all of said hydroxyl groups is(are) subjected to an addition reaction with lacton.

The polyhydric alcohol component used for preparation of the polyester resin may consist entirely of THEIC, or of a combination of THEIC with other polyhydric alcohol(s).

As such other polyhydric alcohols, those normally used in preparation of polyester resins, such as ethylene glycol, propylene glycol, butylene glycol, hexanediol, diethylene glycol, dipropylene glycol, neopentyl glycol, triethylene glycol, glycerin, trimethylolethane, trimethylolpropane, pentaerythritol, and the like may be named.

In said polyhydric alcohol component, the use ratio of THEIC to other polyhydric alcohol(s) is such that, based on the total molar amount of hydroxyl groups in the polyhydric alcohol component, THEIC may range 1–100 mol %, preferably 5–70 mol %, in particular, 10–50 mol %; and other polyhydric alcohol(s), 99–0 mol %, preferably 95–30 mol %, in particular, 90–50 mol %.

Those useful as the polybasic acid component to be reacted with said polyhydric alcohol component are compounds having two or more carboxyl groups per molecule which are usually used for preparation of polyester resin, examples thereof including phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid and anhydrides thereof.

Polyester resin (A) is obtained through esterification reaction of THEIC-containing polyhydric alcohol component and polybasic acid component. More specifically, it is obtained by reacting said two components at temperatures ranging from about 100 to about 200° C. for 1–24 hours, in the optional presence of an organic solvent. As such organic solvent, for example, hydrocarbon type, ester type, ether type, alcohol type and ketone type solvents can be used.

It is generally preferred for thus prepared polyester resin (A) to have a hydroxyl value of 30–300 mgKOH/g, in particular, 60–250 mgKOH/g; an acid value of 0–30 mgKOH/g, in particular, 2–10 mgKOH/g, and a number-average molecular weight of 500–20,000, in particular, 1,000–8,000.

Crosslinking Agent (B):

As said crosslinking agent (B), for example, melamine resin may be named, which is crosslinkable with polyester resin (A) under heating. More specifically, partially etherified melamine formed by etherifying a part of methylol groups in a methylolated melamine with $C_1$–$C_8$ monohydric alcohol, or fully etherified melamine resin in which all the methylol groups are etherified. They may contain 1–5 triazine rings and have their number-average molecular weight preferably within a range of 300–2,000. Melamine resins containing methylol groups and/or imino groups still remaining therein also are usable.

The blend ratio of above-described polyester resin (A) and crosslinking agent (B) can generally be such that, based on the total solid weight of the two components, polyester resin (A) is within the range of 50–90%, preferably 65–80%, and the crosslinking agent (B), 50–10%, preferably 35–20%.

Coloring Pigment (C):

As coloring pigment (C), for example, solid color pigment and metallic pigment exhibiting metallic feeling or interference pattern may be used. They may each be used either alone or in combination of two or more pigments. Examples of useful solid color pigment include inorganic pigments such as titanium dioxide, zinc white (zinc oxide), carbon black, cadmium red, molybdenum red, chrome yellow, chromium oxide, Prussian blue and cobalt blue; and organic pigments such as azo pigments, phthalocyanine pigments, quinacridone pigments, isoindoline pigments, threne pigments and perylene pigments. The metallic pigments include, for example, flakes of aluminum, mica, metal oxide-coated mica and micaceous iron oxide. The amount of these coloring pigments to be blended into the paint composition is suitably selected depending on such factors as coloring power of individual pigments and hiding power required for each resulting coating film.

Process Variant a):

The process variant a) according to the present invention is a method of applying a first colored paint which contains polyester resin (A), second colored paint not containing polyester resin (A) and a clear paint by 3C1B system.

In the process variant a) as the first colored paint a thermosetting liquid paint is used, which is formed by mixing and dispersing above-described polyester resin (A), crosslinking agent (B) and coloring pigment (C) in an organic solvent. The coating film formed therefrom exhibits a solid color or metallic tone. Said coloring pigment (C) is blended to completely hide the color tone of the substrate surface, so that the color tone is not recognizable through the coating film.

As organic solvents useful in said first colored paint, ordinary solvent for paint can be used, eg., a hydrocarbon-type, ester-type, alcohol-type or ketone-type solvent.

The second colored paint according to the process variant a) can be a thermosetting liquid paint which is formulated by mixing and dispersing an ordinary polyester resin (D) for paint, said polyester resin (D) having been prepared not using THEIC in its polyhydric alcohol component, a crosslinking agent (E) and coloring pigment (F) in an organic solvent, and which is capable of forming a colored, transparent coating film of metallic or solid color tone.

Said polyester resin (D) can be prepared in the manner similar to the preparation of polyester resin (A) except that no THEIC is used. The polyester resin (D) preferably has a hydroxyl value of 30–300 mgKOH/g, in particular, 60–250 mgKOH/g, an acid value of 0–30 mgKOH/g, in particular, 2–10 mgKOH/g and a number-average molecular weight of 500–20,000, in particular, 1,000–8,000.

Whereas, as the crosslinking agent (E) and coloring pigment (F), those which are named as crosslinking agent (B) and coloring pigment (C), respectively, are equally useful. Also as the organic solvent, those explained in connection with the first colored paint can be used.

The generally preferred blend ratio of said polyester resin (D) and crosslinking agent (E) in the second colored paint used in the process variant a) is such that, based on the total solid weight of the two components, polyester resin (D) is within a range of 50–90%, in particular, 65–80%; and the crosslinking agent, within that of 50–10%, in particular, 35–20%. The amount of coloring pigment (F) to be blended varies depending on coloring power of individual pigments, which however needs to be of such an extent as will allow recognition of the color tone of the surface coated with the first colored paint, through the coating film formed from the second colored paint.

If necessary, further a hydroxyl-containing acrylic resin (G) may be added to the first or second colored paints to be used in this process variant a).

Hydroxyl-containing acrylic resin (G) is obtained through polymerization in accepted manner of an acrylate monomer and hydroxyl-containing monomer as the essential components, if necessary further using such other monomers as alkoxyester monomer, aminoacrylic monomer, acrylamide monomer, carboxyl-containing monomer, glycidyl-containing monomer and other comonomers.

Acrylate monomer include $C_1$–$C_{22}$ alkyl esters of (meth) acrylic acid, eg., methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate and the like.

Hydroxyl-containing monomer is a compound containing, per molecule, at least one each of hydroxyl group and polymerizable unsaturated bond, examples of which including $C_2$–$C_{20}$ hydroxyalkyl esters of (meth) acrylic acid such as hydroxyethyl (meth)acrylate, hydroxypropyl (meth)acrylate, hydroxybutyl (meth)acrylate and the like.

Furthermore, alkoxyester monomer include $C_2$–$C_{18}$ alkoxyesters of (meth)crylic acid such as methoxybutyl acrylate, methoxybutyl methacrylate, methoxyethyl acrylate, methoxyethyl methacrylate and the like; aminoacrylic monomer includes, for example, N,N-dimethylaminoethyl acrylate, N,N-dimethylaminoethyl methacrylate, N,N-diethylaminoethyl acrylate, N,N-diethylaminoethyl methacrylate, N-t-butylaminoethyl acrylate, N-t-butylaminoethyl methacrylate, N,N-dimethylaminopropyl acrylate, N,N-dimethylaminopropyl methacrylate and the like; acrylamide monomer includes, for example, acrylamide, methacrylamide, N-methylacrylamide, N-methylmethacrylamide, N-ethylacrylamide, N-ethylmethacrylamide, N-butylacrylamide, N-butylmethacrylamide, N-dimethylacrylamide, N-dimethylmethacrylamide, and the like. Carboxyl-containing monomer is a compound containing, per molecule, at least one each of carboxyl group and polymerizable unsaturated bond, examples of which including monocarboxylic acid such as acrylic acid and methacrylic acid, dicarboxylic acid and their modified products such as maleic acid, itaconic acid, fumaric acid and mesaconic acid, anhydrides and half esters of the foregoing. Examples of glycidyl-containing monomer include glycidyl acrylate and glycidyl methacrylate; and examples of other comonomer include styrene, α-methyl-styrene, vinyltoluene, acrylonitrile, vinyl acetate and vinyl chloride.

Generally preferred hydroxyl-containing acrylic resin (G) has a hydroxyl value within a range of 20–200 mgKOH/g, in particular, 40–150 mgKOH/g; an acid value within a range of 0–80 mgKOH/g, in particular, 4–40 mgKOH/g; and a number-average molecular weight within range of 2,000–100,000, in particular, 4,000–60,000.

The amount of use of hydroxyl-containing crylic resin (G) suitably ranges, based on the total solid weight of the polyester resin (A) or polyester resin (D) and said acrylic resin (G), 0–70%, in particular, 10–60%, inter alia, 15–50%, by weight.

The clear paint to be used in the process variant a) of the present invention can be any of those which are customarily used for coating of automobile body panels or the like and are known per se. For example, a thermosetting paint composed mainly of base resin, crosslinking agent and organic solvent is suitable.

Examples of the base resin include acrylic resin, vinyl resin, polyester resin, alkyd resin, urethane resin and the like, which contain crosslinkable functional groups (eg., hydroxyl group, epoxy group, carboxyl group, alkoxysilane group). As the crosslinking agent, for example, alkyletherified melamine resin, urea resin, guanamine resin, optionally blocked polyisocyanate compound, epoxy compound and carboxyl-containing compound for crosslinking and curing said base resin can be named. Those base resin and crosslinking agent are preferably concurrently used at such ratios as, based on the total weight of the two components, that the base resin ranges from 50–90%, in particular, 65–80%, and the crosslinking agent, 50–10%, in particular, 35–20%.

As the organic solvent, customary solvents for paints can be used, which may be of hydrocarbon type, ester type, ether type, alcohol type or ketone type.

It is permissible to blend with the clear paint a solid color pigment, metallic pigment or iridescent pigment, to such an extent as will not impair transparency of the coating film formed therefrom.

In the process variant a) according to the present invention, a first colored paint whose viscosity at the application time is adjusted to 12–20 seconds (Ford (viscosity) cup #4/20° C.) and solid content is adjusted to 15–50 weight % is applied to a coating object, by means of airless spray, air spray, electrostatic coating or the like, to form a coating layer of about 10—about 50 μm in dry thickness. If necessary the applied coating is allowed to stand for 1–20 minutes at room temperature, and then onto the uncured colored coating-applied surface a second colored paint, whose viscosity at the application time is adjusted to 12–20 seconds (Ford (viscosity) cup #4/20° C.) and solid content, to 15–50 weight %, is applied by a similar means, to form a coating layer of about 10—about 50 μm in dry thickness. If necessary the coated object is allowed to stand for 1–20 minutes at room temperature, and then onto the yet uncured, second colored paint-applied surface a clear paint is applied.

The clear paint is adjusted of its viscosity at the application time to 15–40 seconds (Ford (viscosity) cup #4/20° C.) and the solid content, to 30–65 weight %, and applied by such means as airless spray, air spray, electrostatic coating and the like, to make the thickness of its cured coating layer about 20—about 80 μm. If necessary the coated object is allowed to stand for 1–20 minutes at room temperature, and then heated at about 100°—about 180° C., preferably at about 120—about 160° C., for about 10—about 40 minutes. Whereby the three layers of first and second colored paints and clear paint are simultaneously crosslinked and cured to form a multi-layer coating film.

Process Variant b):

The process variant b) of the present invention provides a method of applying a first colored paint containing no polyester resin (A), a second colored paint containing polyester resin (A) and a clear paint by 3C1B system.

More specifically, the process variant b) can be practiced in the manner similar to the process variant a), except that polyester resin (D) is used in the first colored paint instead of polyester resin (A), and the polyester resin (A) is used in the second colored paint instead of the polyester resin (D).

Process Variant c):

The process variant c) according to the present invention is a method of applying a polyester (A)-containing first colored paint, a polyester (A)-containing second colored paint and a clear paint by 3C1B system.

More specifically, the process variant c) can be practiced in the manner similar to the process variant a), except that the polyester resin (D) in the second colored paint is replaced with a polyester resin (A) which may be of the same or different kind from the polyester resin (A) used in the first colored paint.

According to the above-described method of the present invention, the following effects are obtained.

(1) Because micronization at the time of spray coating the first and second colored paints to be used in the present method is improved, the resulting multi-layer coating film exhibits better levelling property.

(2) When the first and second colored paints and a clear paint are applied by 3C1B system, no mixing of layers at their interfaces is recognized, and the finished appearance of the formed multi-layer coating film is improved.

(3) The multi-layer coating film formed by the method of the present invention excels in chipping resistance.

Hereinafter the method of the present invention is explained more specifically, referring to working and comparative examples, in which parts and percentages are by weight.

PREPARATION OF SAMPLES

1) Coating Object:

A phosphate-treated steel plate of a size 150×100×0.8 mm was coated with a polyamine-modified epoxy resin-type cationic electropaint and then with a polyester resin-melamine resin type inter coat, which coating layers were subsequently cured under heating.

2) Polyester Resin (A-1):

Hexahydrophthalic anhydride 0.7 mol, 1,6-hexanediol 0.727 mol and THEIC 0.273 mol were heated to 230° C. in the presence of an esterification catalyst, dibutyltin oxide (0.025 phr). After maintaining the system at said temperature for an hour, xylene was added, followed by about six hours' reflux at the same temperature while distilling water off, to form polyester resin (A-1). The polyester resin had a hydroxyl value of 194 mgKOH/g, an acid value of 2 mgKOH/g and a number-average molecular weight of 1,000.

(A-2):

Hexahydrophthalic anhydride 0.875 mol, 1,6-hexanediol 0.727 mol and THEIC 0.273 mol were heated to 230° C. in the presence of an esterification catalyst, dibutyltin oxide (0.025 phr). After maintaining the system at said temperature for an hour, xylene was added, followed by about six hours' reflux at the same temperature while distilling water off, to form polyester resin (A-2). The polyester resin had a hydroxyl value of 106 mgKOH/g, an acid value of 2 mgKOH/g and a number-average molecular weight of 1,500.

(D-1):

Hexahydrophthalic anhydride 0.7 mol, 1,6-hexanediol 0.727 mol and trimethylolpropane 0.273 mol were heated to 230° C. in the presence of an esterification catalyst, dibutyltin oxide (0.025 phr). After maintaining the system at said temperature for an hour, xylene was added, followed by about six hours' reflux at the same temperature while distilling water off, to form polyester resin (D-1). The polyester resin had a hydroxyl value of 224 mgKOH/g, an acid value of 2 mgKOH/g and a number-average molecular weight of 1,300.

(D-2):

Hexahydrophthalic anhydride 0.875 mol, 1,6-hexanediol 0.727 mol and trimethylolpropane 0.273 mol were reacted at 230° C. to form polyester resin (D-2) for colored paint. The polyester resin had a hydroxyl value of 74 mgKOH/g, an acid value of 2 mgKOH/g and a number-average molecular weight of 2,000.

3) Crosslinking Agent (B-1):

"U-Van® 28–60" (Mitsui Toatsu Chemicals, Inc., a melamine rein)

4) Acrylic Resin (G-1):

An acrylic resin formed through polymerization of methyl methacrylate/n-butyl acrylate/hydroxyethyl methacrylate/acrylic acid at weight ratios of 52/32/15/1, which had a number-average molecular weight of about 32,000.

5) Preparation of First Colored Paints

First colored paints were formulated by mixing the components as identified in Table 1 of each indicated amount and their viscosity was adjusted with a solvent (xylene) to 13 seconds (Ford (viscosity) cup #4/20° C.). The blended amounts as indicated in Table 1 are by solid contents.

TABLE 1

| | | First Colored Paint | | | |
| | | a | b | c | d |
| --- | --- | --- | --- | --- | --- |
| Polyester | Sample code | A-1 | A-2 | D-1 | D-2 |
| Resin | Amount (part) | 70 | 30 | 70 | 30 |
| Crosslinking | Sample code | B-1 | B-1 | B-1 | B-1 |
| Agent | Amount (part) | 30 | 30 | 30 | 30 |
| Acrylic | Sample code | — | G-1 | — | G-1 |
| Resin | Amount (part) | — | 40 | — | 40 |
| Pigment | | titanium white pigment | | | |
| | Amount (part) | 80 | 80 | 80 | 80 |

6) Preparation of Second Colored Paints

Second colored paints were formulated by mixing the components as identified in Table 2 of each indicated amount, and their viscosity was adjusted with a solvent (xylene) to 13 seconds (Ford (viscosity) cup #4/20° C.). The blended amounts as indicated in Table 2 are by solid contents. In the same table, "IRIODIN® 103R" is a white pearly tone iridescent pigment marketed by Ciba Geygie.

TABLE 2

| | | Second Colored Paint | | | |
| | | e | f | g | h |
| --- | --- | --- | --- | --- | --- |
| Polyester | Sample code | A-1 | A-2 | D-1 | D-2 |
| Resin | Amount (part) | 70 | 30 | 70 | 30 |
| Crosslinking | Sample code | B-1 | B-1 | B-1 | B-1 |
| Agent | Amount (part) | 30 | 30 | 30 | 30 |
| Acrylic | Sample code | — | G-1 | — | G-1 |
| Resin | Amount (part) | — | 40 | — | 40 |
| Iridescent | | IRIODIN ® 103R | | | |
| Pigment | Amount (part) | 5 | 5 | 5 | 5 |

7) Clear Paint

"MAGICRON® KINO #1001T2" (Kansai Paint Co., Ltd., an acid-epoxy-type paint which contains a carboxyl-containing acrylic resin and an epoxy-containing compound) was used, whose viscosity was adjusted with a solvent to 22 seconds (Ford (viscosity) cup #4/20° C.).

EXAMPLES AND COMPARATIVE EXAMPLES

The coating object was spray-coated with a first colored paint to the cured film thickness of 15–20 μm, allowed to stand for 5 minutes at room temperature, further spray-coated onto the coated surface with a second colored paint to the cured film thickness of 15–20 μm, allowed to stand for 5 minutes at room temperature, then spray-coated with a clear paint to the cured film thickness of 45–50 μm, allowed to stand for 5 minutes at room temperature, and heated at 140° C. for 30 minutes to simultaneously cure the three-layer coating film. These coating steps and the result of performance tests of the resultant multi-layer coating films are shown in Table 3.

TABLE 3

|  | Examples | | | | Comparative Examples | |
|---|---|---|---|---|---|---|
|  | 1 | 2 | 3 | 4 | 1 | 2 |
| First colored paint | a | b | a | c | c | d |
| Second colored paint | e | f | h | f | g | h |
| Clear paint | MAGICRON ® KINO #1001T2 | | | | | |
| Performance test result* | | | | | | |
| Finished appearance | ○ | ○ | ○ | ○ | X | Δ |
| Mottling phenomenon | ○ | ○ | ○ | ○ | X | Δ |
| Chipping resistance | ○ | ○ | ○ | ○ | X | Δ |

*Test methods

Finished Appearance
    visual evaluation, the norm of evaluation is as follows:
        ○: good levelling property
        Δ: inferior levelling property
        X: very poor levelling property Mottling Phenomenon
    visual evaluation, the norm of evaluation is as follows:
        ○: good glossy effect
        Δ: inferior glossy effect
        X: very poor glossy effect.

Chipping Resistance
    #7 crushed stone 500 g was blown against each of the coated surface at an angle of 45°, at 20° C. and under an air pressure of 0.3 Mpa, using Gravelo-meter (Q-Panel Co., Ltd.), to exert an impact onto the coated film. Then an adhesive cellophane tape was stuck onto the coated surface and rapidly pulled off. After the peeling, peeling condition of the coated film caused by the impact was examined. The result was evaluated according to a three-grade system as follows:
        ○: nearly no peeling of coated film observed
        Δ: a little peeling of coated film observed
        X: heavy peeling of coated film observed

What is claimed is:

1. A method for forming a multi-layer coating film which comprises applying a first colored paint, second colored paint and a clear paint by 3 coat-1 bake system onto an object to be coated, which is characterized in that at least either one of said first and second colored paints comprises a polyester resin, crosslinking agent and coloring pigment, said polyester resin being one prepared with use of tris(2-hydroxyethyl)isocyanurate as at least a part of its polyhydric alcohol component.

2. A method according to claim 1, in which both of the first and second colored paints comprise a polyester resin, crosslinking agent and coloring pigment, said polyester resin being one prepared with use of tris(2-hydroxyethyl)isocyanurate as at least a part of its polyhydric alcohol component.

3. A method according to claim 1, in which the polyester resin is one prepared with use of 1–100 mol % of tris(2-hydroxyethyl)isocyanurate, based on the total molar amount of hydroxyl groups in the polyhydric alcohol component.

4. A method according to claim 1, in which the polyester resin is one prepared with use of 5–70 mol % of tris(2-hydroxyethyl)isocyanurate, based on the total molar amount of hydroxyl groups in the polyhydric alcohol component.

5. A method according to claim 1, in which the polyester resin has a hydroxyl value of 30–300 mgKOH/g and an acid value of 0–30 mgKOH/g.

6. A method according to claim 1, in which the polyester resin has a number-average molecular weight of 500–20,000.

7. A method according to claim 1, in which the crosslinking agent is melamine resin.

8. A method according to claim 1, in which the coloring pigment is selected from solid color pigments and metallic pigments.

9. A method according to claim 1, in which the first colored paint or second colored paint further contains a hydroxyl-containing acrylic resin.

10. Articles on which multi-layer coating is formed by the method of claim 1.

* * * * *

UNITED STATES PATENT AND TRADEMARK OFFICE
CERTIFICATE OF CORRECTION

PATENT NO. : 6,083,564　　　　　　　　　　　　　　　　　　　Page 1 of 1
DATED : July 4, 2000
INVENTOR(S) : Hiroshi Igarashi et al.

It is certified that error appears in the above-identified patent and that said Letters Patent is hereby corrected as shown below:

Title page,
Item [22], correct the filing date of the application to --Aug. 26, 1998--.

Signed and Sealed this

Tenth Day of July, 2001

*Nicholas P. Godici*

Attest:

Attesting Officer

NICHOLAS P. GODICI
*Acting Director of the United States Patent and Trademark Office*